United States Patent
Hosoya

(10) Patent No.: US 9,454,983 B2
(45) Date of Patent: Sep. 27, 2016

(54) MAGNETIC POWDER FOR MAGNETIC RECORDING, MAGNETIC RECORDING MEDIUM, AND METHOD OF MANUFACTURING MAGNETIC POWDER FOR MAGNETIC RECORDING

(71) Applicant: FUJIFILM Corporation, Minato-ku, Tokyo (JP)

(72) Inventor: Yoichi Hosoya, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 92 days.

(21) Appl. No.: 14/584,557

(22) Filed: Dec. 29, 2014

(65) Prior Publication Data

US 2015/0187471 A1    Jul. 2, 2015

(30) Foreign Application Priority Data

Dec. 27, 2013   (JP) .................... 2013-272767

(51) Int. Cl.

| | |
|---|---|
| *G11B 5/714* | (2006.01) |
| *H01F 1/10* | (2006.01) |
| *G11B 5/706* | (2006.01) |
| *C01G 49/00* | (2006.01) |
| *H01F 1/11* | (2006.01) |

(52) U.S. Cl.
CPC ....... *G11B 5/70678* (2013.01); *C01G 49/0036* (2013.01); *H01F 1/11* (2013.01); *C01P 2004/10* (2013.01); *C01P 2004/20* (2013.01); *C01P 2004/32* (2013.01); *C01P 2004/54* (2013.01); *C01P 2004/64* (2013.01); *C01P 2006/42* (2013.01); *Y10T 428/2982* (2015.01)

(58) Field of Classification Search
CPC ............ H01F 1/0315; G11B 5/70678; C01G 49/0036; C01P 2006/42; C01P 2004/64
See application file for complete search history.

(56) References Cited

U.S. PATENT DOCUMENTS 5,433,878 A * 7/1995 Arai .................... B01J 3/008
                                               252/62.63

FOREIGN PATENT DOCUMENTS

| JP | 62-241827 A | 10/1987 |
|---|---|---|
| JP | 06-302421 A | 10/1994 |
| JP | 08-040723 A | 2/1996 |
| JP | 2009-208969 A | 9/2009 |

OTHER PUBLICATIONS

Office Action dated Oct. 20, 2015 from the Japanese Patent Office in counterpart Japanese Application No. 2013-272767.

* cited by examiner

*Primary Examiner* — Carol M Koslow
(74) *Attorney, Agent, or Firm* — Sughrue Mion, PLLC

(57) ABSTRACT

An aspect of the present invention relates to a method of manufacturing hexagonal ferrite powder, which comprises preparing a hexagonal ferrite precursor-containing water-based solution by stirring and mixing a reaction solution which comprises an iron salt, an alkaline earth metal salt, and a base in a reaction tank, and removing the hexagonal ferrite precursor-containing water-based solution that has been prepared from the reaction tank and continuously feeding the hexagonal ferrite precursor-containing water-based solution into a reaction flow passage while conducting heating and pressurizing to converting the hexagonal ferrite precursor to hexagonal ferrite, wherein the preparation of the hexagonal ferrite precursor-containing water-based solution comprises a continual feed period during which feeding of the iron salt, the alkaline earth metal salt, and the base into a reaction tank which comprises a prereaction solution in which an iron salt and a base are not both present is continuously or intermittently continued, during the continual feed period, at least a base is fed over a feed passage separate from feeding of the iron salt and the alkaline earth metal salt, and an amount of at least one from among the iron salt, the alkaline earth metal salt, and the base that is fed per unit time during the continual feed period is controlled and/or acid is added to the reaction solution in the reaction tank so that a pH of the reaction solution within the reaction tank during the continual feed period falls within a range relative to a $pH_{before}$, a pH of the prereaction solution, of $pH_{before}-2 \leq pH \leq pH_{before}+2$.

15 Claims, 3 Drawing Sheets

MAGNETIC POWDER FOR MAGNETIC RECORDING, MAGNETIC RECORDING MEDIUM, AND METHOD OF MANUFACTURING MAGNETIC POWDER FOR MAGNETIC RECORDING

CROSS-REFERENCE TO RELATED APPLICATIONS

This application claims priority under 35 U.S.C 119 to Japanese Patent Application No. 2013-272767 filed on Dec. 27, 2013. The above application is hereby expressly incorporated by reference, in its entirety.

BACKGROUND OF THE INVENTION

1. Field of the Invention

The present invention relates to a method of manufacturing hexagonal ferrite powder.

The present invention further relates to hexagonal ferrite powder that is manufactured by the above manufacturing method, and to a magnetic recording medium containing the above hexagonal ferrite powder in a magnetic layer.

2. Discussion of the Background

Hexagonal ferrite is widely employed as magnetic powder for magnetic recording. The coercive force thereof is great enough for use in permanent magnetic materials. The magnetic anisotropy that is the basis of the coercive force derives from its crystal structure. Thus, high coercive force can be maintained even when the size of the particles is reduced. Further, magnetic recording media employing hexagonal ferrite in a magnetic layer have high density characteristics due to the vertical component. Thus, hexagonal ferrite is ferromagnetic powder that is suited to high density recording.

Various methods of manufacturing hexagonal ferrite have been proposed, including the coprecipitation method, the hydrothermal synthesis method, and the glass crystallization method. Of these, manufacturing methods utilizing a continuous hydrothermal synthesis reaction (a continuous hydrothermal synthesis process) in a high-temperature, high-pressure water-based fluid have been garnering attention in recent years as methods permitting the manufacturing of hexagonal ferrite with high productivity (for example, see Japanese Unexamined Patent Publication (KOKAI) Heisei No. 6-302421 or English language family member U.S. Pat. No. 5,433,878, Japanese Unexamined Patent Publication (KOKAI) Heisei No. 8-40723, and Japanese Unexamined Patent Publication (KOKAI) No. 2009-208969, which are expressly incorporated herein by reference in their entirety).

SUMMARY OF THE INVENTION

For example, the use of fine magnetic powder as the ferromagnetic powder contained in the magnetic layer has been needed to decrease noise and increase the fill rate of the magnetic layer in the field of magnetic recording. Additionally, the above-mentioned continuous hydrothermal synthesis process is a method that permits the manufacturing of hexagonal ferrite with high productivity. However, there is a need for greater reduction in the size of the hexagonal ferrite obtained.

In the field of magnetic recording, when the particle size distribution is broad despite a small average particle size in magnetic powder, for example, components on the small particle side of the particle size distribution may be affected by thermal fluctuation, the magnetic energy that has been recorded may be overcome by thermal energy, and the possibility of recording loss exists. There are also cases where noise increases due to components on the coarse particle side of the particle size distribution. Thus, as the particle size decreases, a uniform particle size and a sharp particle size distribution are demanded of hexagonal ferrite employed in the magnetic recording field. Hexagonal ferrite in the form of fine particles with good particle size uniformity is useful in various fields, not just in the field of magnetic recording.

An aspect of the present invention provides for a method of manufacturing hexagonal ferrite in the form of fine particles of good particle size uniformity by the continuous hydrothermal synthesis process.

The above continuous hydrothermal synthesis process is a method for obtaining hexagonal ferrite by placing a precursor of hexagonal ferrite in the presence of highly reactive water that has been heated and pressurized to convert the precursor to hexagonal ferrite. The present inventor conducted extensive research into the continuous hydrothermal synthesis process, resulting in the following discovery.

In the methods described in Japanese Unexamined Patent Publication (KOKAI) Heisei No. 6-302421 and Japanese Unexamined Patent Publication (KOKAI) Heisei No. 8-40723, the preparation of precursor and the conversion of the precursor into hexagonal ferrite are conducted over the same reaction flow passage. However, these methods do not allow the precursor preparation conditions to be controlled independently from the reaction conditions for conversion to hexagonal ferrite. By contrast, while conducting extensive research, the present inventor considered that it is better to to control the precursor preparation conditions to obtain hexagonal ferrite in the form of fine particles exhibiting a sharp particle size distribution. The fact that the precursor that was converted to hexagonal ferrite was coarse and the fact that there was variation in size were thought to be the causes behind the variation in particle size and the coarseness of the particles of hexagonal ferrite that were obtained by converting the precursor.

Thus, the present inventor conducted further extensive research. As a result, he discovered that hexagonal ferrite in the form of fine particles of good uniformity of particle size distribution could be obtained by conducting the precursor preparation step while continuously feeding the starting material (including a base for adjusting the pH) to the reaction tank and by keeping the variation in pH in the reaction tank to within a range of ±2 of the initial pH by controlling the amount of starting material that was fed per unit time, by adding an acid, or both, in addition to conducting the precursor preparation step separately from the step of converting the precursor to hexagonal ferrite. The present inventor presumed that the fact that the reaction progressed moderately because the precursor was prepared by feeding the starting material to the reaction tank continuously primarily contributed to the reduction in size of the hexagonal ferrite that was finally obtained, and the fact that variation in the pH of the reaction tank during precursor preparation was inhibited primarily contributed to the improved uniformity in the particle size distribution.

Japanese Unexamined Patent Publication (KOKAI) No. 2009-208969 discloses that a precursor solution that is prepared in a precursor tank is flowed and converted to ferrite nanoparticles in a flow-type reactor. However there is no suggestion of the need to control the preparation conditions in the precursor preparation step that is conducted as a prior step to improve the uniformity of the particle size and decrease the particle size of the hexagonal ferrite that is synthesized by the continuous hydrothermal process.

The present invention was devised based on the above discoveries.

An aspect of the present invention relates to a method of manufacturing hexagonal ferrite powder, which comprises:

preparing a hexagonal ferrite precursor-containing water-based solution by stirring and mixing a reaction solution which comprises an iron salt, an alkaline earth metal salt, and a base in a reaction tank; and removing the hexagonal ferrite precursor-containing water-based solution that has been prepared from the reaction tank and continuously feeding the hexagonal ferrite precursor-containing water-based solution into a reaction flow passage while conducting heating and pressurizing to converting the hexagonal ferrite precursor to hexagonal ferrite; wherein the preparation of the hexagonal ferrite precursor-containing water-based solution comprises a continual feed period during which feeding of the iron salt, the alkaline earth metal salt, and the base into a reaction tank which comprises a prereaction solution in which an iron salt and a base are not both present is continuously or intermittently continued;

during the continual feed period, at least a base is fed over a feed passage separate from feeding of the iron salt and the alkaline earth metal salt; and an amount of at least one from among the iron salt, the alkaline earth metal salt, and the base that is fed per unit time during the continual feed period is controlled and/or acid is added to the reaction solution in the reaction tank so that a pH of the reaction solution within the reaction tank during the continual feed period falls within a range relative to a $pH_{before}$, a pH of the prereaction solution, of $$pH_{before}-2 \leq pH \leq pH_{before}+2.$$

In an embodiment, the feeding of the iron salt, the alkaline earth metal salt, and the base is conducted over separate feed passages in the preparation of the hexagonal ferrite precursor-containing water-based solution.

In an embodiment, the iron salt and the alkaline earth metal salt are mixed and then fed to the reaction tank over the same feed passage in the preparation of the hexagonal ferrite precursor-containing water-based solution.

In an embodiment, at least an amount of the base being fed per unit time is increased, decreased, increased and then decreased, or decreased and then increased during the continual feed period.

In an embodiment, during the continual feed period, during a period within which an amount of the iron salt and the alkaline earth metal salt being fed per unit time is not varied, an amount of the base that is being fed per unit time is increased, decreased, increased and then decreased, or decreased and then increased. In the present invention, the term "is not varied" means that the amount fed per unit time does not change, either as actually measured or as a setting value of the amount fed by a device. Change for reasons not intended by the operator, such as the operational precision of the device, is permitted.

In an embodiment, the iron salt, the alkaline earth metal salt, and the base are fed as solutions.

In an embodiment, the removal of the hexagonal ferrite precursor-containing solution that has been prepared from the reaction tank is conducted in parallel with feeding the iron salt, the alkaline earth metal salt, and the base.

In an embodiment, the preparation of the precursor-containing water-based solution is conducted in a batch reaction tank.

In an embodiment, the hexagonal ferrite precursor-containing water-based solution that is removed from the reaction tank is mixed with an organic compound and then continuously flowed in a reaction flow passage while being heated and pressurized.

In an embodiment, the above method further comprises feeding an organic compound to the reaction tank in the preparation of the hexagonal ferrite precursor-containing water-based solution.

In an embodiment, the heating and the pressurizing are conducted by heating the hexagonal ferrite precursor-containing water-based solution flowing through the reaction flow passage to equal to or higher than 300° C. and pressurizing to equal to or higher than 20 MPa.

A further aspect of the present invention relates to hexagonal ferrite powder manufactured by the above manufacturing method.

In an embodiment, the above hexagonal ferrite powder is magnetic powder for magnetic recording (also referred to as "magnetic recording powder").

In an embodiment, the above hexagonal ferrite powder has an average particle size of equal to or less than 35 nm and a coefficient of variation in particle size of equal to or less than 25 percent.

In the present invention, the average particle size refers to the value determined by the method set forth below.

A photograph is taken of the particles at a magnification of 100,000-fold with a model H-9000 transmission electron microscope made by Hitachi, and printed on print paper at a total magnification of 500,000-fold. Target particles are selected from the photograph of the particles, the contours of the particles are traced with a digitizer, and Carl Zeiss image analysis software KS-400 is used to measure the size of the particles. The particle sizes of 500 particles are determined. In this context, the particle size is a primary particle size. The term "primary particle" refers to an unaggregated, independent particle. The average value (arithmetic average) of the particle size of the 500 particles obtained in this manner is adopted as the average particle size of the powder. The coefficient of variation in particle size is a value calculated by dividing the standard deviation of the particle sizes of 500 particles by the average particle size.

In the present invention, the size of the particles constituting powder is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The average particle size set forth above can be obtained by observing the powder that is present as powder by a transmission electron microscope. A measurement sample of the powder that is contained in the magnetic layer of a magnetic recording medium can be obtained by collecting powder from the magnetic layer. The measurement sample can be collected, for example, by the following method.

1. Subjecting the surface of the magnetic layer to 1 to 2 minutes of surface treatment with a plasma reactor made by Yamato Scientific Co., Ltd., and ashing the organic components (binder component and the like) of the surface of the magnetic layer to remove them.

2. Adhering filter paper that has been immersed in an organic solvent such as cyclohexanone or acetone to the edge portion of a metal rod, rubbing the surface of the magnetic layer that has been treated as in 1. above on it, and transferring the magnetic layer component from the magnetic tape to the filter paper to separate it.

3. Shaking off the component separated by 2. above in a solvent such as cyclohexanone or acetone (placing each piece of filter paper in solvent and using an ultrasonic disperser to shake it off), drying the solvent, and removing the separated component.

4. Placing the component that has been scraped off in 3. above in a glass test tube that has been thoroughly cleaned, adding n-butyl amine to about 20 mL of the magnetic layer component, and sealing the glass test tube. (The n-butyl amine is added in a quantity adequate to decompose the remaining binder that has not been ashed.)

5. The glass test tube is heated for equal to or more than 20 hours at 170° C. to decompose the binder and curing agent component.

6. The precipitate following the decomposition of 5. above is thoroughly washed with pure water and dried, and the powder is recovered.

7. A neodymium magnet is placed near the powder that has been collected in 6. and the powder that is attracted (that is, magnetic powder) is collected.

Magnetic powder can be collected from the magnetic layer by the above steps. Since the above processing can impart almost no damage to the particles, the above method permits measurement of the particle size of powder in the state in which it was contained in the magnetic layer.

A further aspect of the present invention relates to a magnetic recording medium, which comprises a magnetic layer comprising ferromagnetic powder and binder on a nonmagnetic support, wherein the ferromagnetic powder is the above hexagonal ferrite powder.

An aspect of the present invention can provide hexagonal ferrite powder in the form of fine particles of good particle size uniformity by the continuous hydrothermal synthesis process. The hexagonal ferrite powder thus obtained can be employed as the ferromagnetic powder of a magnetic layer to provide a magnetic recording medium with good electromagnetic characteristics.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
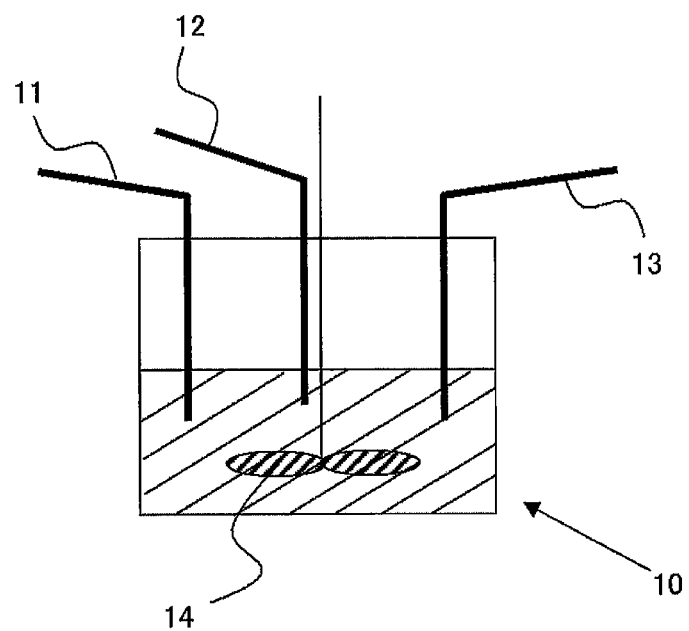
FIG. 1 is a schematic sectional view showing an example of a batch reaction tank that can be used to prepare the precursor-containing water-based solution.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Method of Manufacturing Hexagonal Ferrite Powder

An aspect of the present invention relates to a method of manufacturing hexagonal ferrite powder, which comprises:

preparing a hexagonal ferrite precursor-containing water-based solution by stirring and mixing a reaction solution which comprises an iron salt, an alkaline earth metal salt, and a base in a reaction tank; and removing the hexagonal ferrite precursor-containing water-based solution that has been prepared from the reaction tank and continuously feeding the hexagonal ferrite precursor-containing water-based solution into a reaction flow passage while conducting heating and pressurizing to converting the hexagonal ferrite precursor to hexagonal ferrite; wherein the preparation of the hexagonal ferrite precursor-containing water-based solution comprises a continual feed period during which feeding of the iron salt, the alkaline earth metal salt, and the base into a reaction tank which comprises a prereaction solution in which an iron salt and a base are not both present is continuously or intermittently continued;

during the continual feed period, at least a base is fed over a feed passage separate from feeding of the iron salt and the alkaline earth metal salt; and an amount of at least one from among the iron salt, the alkaline earth metal salt, and the base that is fed per unit time during the continual feed period is controlled and/or acid is added to the reaction solution in the reaction tank so that a pH of the reaction solution within the reaction tank during the continual feed period falls within a range relative to a $pH_{before}$, a pH of the prereaction solution, of $$pH_{before}-2 \leq pH \leq pH_{before}+2.$$

By implementing the step of preparing the precursor-containing water-based solution as set forth above, it is possible to obtain hexagonal ferrite powder in the form of fine particles with increased particle size uniformity by subjecting the precursor that is prepared to the continuous hydrothermal synthesis process.

The above manufacturing method will be described in greater detail below.

<Preparation of the Precursor-Containing Water-Based Solution>

(i) Starting Material and Water-Based Solvent

Synthesis of hexagonal ferrite by the continuous hydrothermal synthesis process can be conducted by feeding a precursor—which can convert to hexagonal ferrite (ferrite conversion) when placed in the presence of high-temperature, high-pressure water—into a reaction flow passage into which a water-based fluid is being continuously flowed while being heated and pressurized, thereby converting the precursor to hexagonal ferrite. The precursor can be one that is highly soluble in water and dissolve in water-based solvents, described further below, or one that is poorly soluble in water and is in the form of a dispersion (sol) of colloidal particles in a water-based solvent.

Magnetoplumbite-type (M-type), W-type, Y-type, and Z-type crystal structures of hexagonal ferrite are known. The hexagonal ferrite obtained in the above manufacturing method can assume any crystal structure. For example, M-type hexagonal ferrite that contains no substitute elements is a metal oxide denoted by $AFe_{12}O_{19}$. In this context, A denotes an alkaline earth metal such as barium, strontium, or calcium. In the hexagonal ferrite, some portion of the above metal element can be replaced with a substitute element, described further below.

The precursor of the hexagonal ferrite set forth above can be obtained by mixing an iron salt and an alkaline earth metal salt in a water-based solution. Normally, salts including the iron salt and an alkaline earth metal salt precipitate out as particles, desirably colloidal particles, in the water-based solution. The particles that precipitate here are subsequently converted to ferrite by being placed in the presence of high-temperature, high-pressure water, becoming hexagonal ferrite.

Alkaline earth metal salts of barium, strontium, calcium, or the like can be employed as the alkaline earth metal salt. It suffices to select the type of alkaline earth metal based on the desired hexagonal ferrite. For example, when barium ferrite is desired, barium salt is employed as the alkaline earth metal salt. When strontium ferrite is desired, strontium salt is employed. When mixed crystals of barium ferrite and strontium ferrite are desired, it suffices to use a barium salt and strontium salt in combination as the alkaline earth metal salt. The salt is desirably water soluble. By way of example, hydroxides; halides such as chlorides, bromides, and iodides; and nitrates can be employed.

A water-soluble salt of iron, such as a halide such as a chloride, bromide, or iodide, a nitrate, a sulfate, a carbonate, a salt of an organic acid, or a complex salt can be employed as the iron salt. It suffices to determine the blending ratio and addition amounts of the iron salt and the alkaline earth metal salt based on the ferrite composition that is desired. In addition to an iron salt and an alkaline earth metal salt, salts of optional elements that are capable of constituting hexagonal ferrite with iron and alkaline earth metals can also be added. Examples of such optional elements are Nb, Co, Ti, and Zn. The amount of the salt of the optional element can be determined based on the ferrite composition that is desired.

The above-described salts can be stirred and mixed in a water-based solution containing a base to cause hexagonal ferrite precursor containing the elements contained in these salts to precipitate. Primarily, the hydroxide ion ($OH^-$) in the water-based solvent containing the base is thought to form a hydroxide sol with the iron ions contained in the iron salt and the alkaline earth metal ions contained in the alkaline earth metal salt, thereby forming the precursor. The precursor that precipitates here can be subsequently converted (ferrite converted) into hexagonal ferrite.

In the present invention, the term "base" refers to one or more bases as defined by Arrhenius, Bronsted, or Lewis (Arrhenius bases, Bronsted bases, or Lewis bases). The same applies to the acids described in detail further below; the term "acid" refers to one or more acids as defined by Arrhenius, Bronsted, or Lewis (Arrhenius acids, Bronsted acids, or Lewis acids).

Specific examples of bases are sodium hydroxide, potassium hydroxide, sodium carbonate, and ammonia water. However, there is no limitation to these bases. Nor is there any limitation to inorganic bases; organic bases can also be employed. In the manufacturing method set forth above, the reaction solution contains a base. However, since some of the salts that are added to the reaction solution along with the base may exhibit acidity, the pH of the reaction solution is not limited to being basic. In some cases, it will be neutral or acidic. The pH of the reaction solution as the pH at the solution temperature during the reaction is equal to or higher than 4 but equal to or lower than 14, for example. From the perspective of getting the precursor synthesis reaction to progress smoothly, it is desirably equal to or higher than 5 but equal to or lower than 14, preferably equal to or higher than 6 but equal to or lower than 13, and more preferably, equal to or higher than 6 but equal to or lower than 12. A pH of equal too or higher than 7, or exceeding 7 (neutral to basic) is still more preferable. The temperature of the reaction solution during the reaction can be controlled by heating or cooling, or can be uncontrolled at room temperature. The solution temperature desirably falls within a range of 10° C. to 90° C.; the reaction will progress adequately without temperature regulation (for example, at about 20° C. to 25° C.). Heating means and cooling means can be provided in the batch reaction tanks and continuous reaction tanks described further below.

The water-based solvent refers to a solvent that contains water, water alone, or to a mixed solvent of water and an organic solvent. The water-based solvent desirably comprises equal to or more than 50 weight percent of water, and is preferably water alone.

An organic solvent that is miscible with water or hydrophilic is desirable as the organic solvent that can be used in combination with water in the water-based solvent. From this perspective, polar solvents are suitably employed. In this context, the term "polar solvent" refers to a solvent with a dielectric constant of equal to or higher than 15, with a solubility parameter of equal to or higher than 8, or both. Examples of desirable organic solvents are alcohols, ketones, aldehydes, nitriles, lactams, oximes, amides, ureas, amines, sulfides, sulfoxides, phosphoric acid esters, carboxylic acids, and carboxylic acid derivatives in the form of esters, carbonic acid, carbonic acid esters, and ethers.

(ii) Feeding the Iron Salt, Alkaline Earth Metal Salt, and Base to the Reaction Tank In the manufacturing method according to an aspect of the present invention, as set forth above, the precursor preparation step is conducted while continuing to feed the starting material to the reaction tank. From the perspective of uniformly mixing the starting materials that are fed, it is desirable for the reaction tank to contain at least a water-based solvent prior to the start of the continual feed period. The details of the water-based solvent are as set forth above. It suffices for one or more components selected from the group consisting of iron salt, alkaline earth metal salts, and bases to be contained in the water-based solvent in the reaction tank at the start of continual feeding. However, to achieve a good effect by continuing to feed the starting material, the solution (prereaction solution) in the reaction tank before the start of the continual feed period does not contain both an iron salt and a base. The main reason for this is that hydroxides that are formed by iron ions and hydroxide ions have poor solubility in water-based solution, so when an iron salt is present with an alkaline earth metal salt, there is a high probability that precipitates will begin to form. Since the solubility in water-based solution of hydroxides formed by alkaline earth metal ions and hydroxide ions is relatively high, the probability of precipitates forming when an alkaline earth metal salt and a base are both present is low. Accordingly, the presence of both an alkaline earth metal salt and a base in the prereaction solution is permitted. The pH of the water-based solution comprising a salt, a base, and the like in a water-based solvent is as set forth for the pH of the reaction solution above. Prior to the start of continual feeding, the pH can be adjusted by means of an acid or a base. The base employed here is as set forth above. Examples of acids that can be employed without limitation are acids the use of which in pH adjustment is known, such as hydrochloric acid, nitric acid, and sulfuric acid. Both inorganic and organic acids can be used as the acid.

The reaction tank is a batch (also referred to as "batch-type") reaction tank in one embodiment, and a continuous (also referred to as "continuous-type") reaction tank in another embodiment. In the batch reaction tank, the feeding and reacting of the starting materials and the removal of the reaction product are conducted in separate steps. Conversely, in the continuous reaction tank, the feeding and reacting of the starting materials and the removal of the reaction product are conducted in parallel. Accordingly, the continuous reaction tank is equipped with at least one feed flow passage and at least one discharge flow passage. The above manufacturing method can be implemented using either reaction tank. The embodiment employing a batch reaction tank and the embodiment employing a continuous reaction tank will be specifically described below with reference to the drawings. However, the present invention is not limited to these specific embodiments.

FIG. 1 is a schematic sectional view showing an example of a batch reaction tank that can be used to prepare the precursor-containing water-based solution. Batch reaction tank 10 that is shown in FIG. 1 is equipped with feed passages 11, 12, and 13 that feed starting materials to the reaction tank. Each of the feed passages is connected to a starting material storage tank, not shown. The starting material in the starting material storage tank is normally fed in the form of a solution to the reaction tank by a feed pump, not shown. The feed pump can control the amount of starting material being fed by changing the flow rate. Iron salt, alkaline earth metal salt, and base can be fed to the reaction tank over the three feed passages. FIG. 1 shows a reaction tank with three feed passages. In this embodiment, the iron salt, alkaline earth metal salt, and base are each fed to the reaction taken over a separate passage. However, in the above manufacturing method, it suffices to feed at least the base to the reaction tank over a separate feed passage from the iron salt and the alkaline earth metal salt. The iron salt and the alkaline earth metal salt can be mixed and then fed to the reaction tank over a single feed passage. The reason that the base is supplied over a separate feed passage from the other starting materials is, as described in detail further below, because the amount of base being fed should be separately set and adjusted from the amount of other starting materials being fed to inhibit variation in the pH of the reaction solution in the reaction tank, regardless of whether or not the amount of base being supplied per unit time varies during the continual feed period. The same applies to the embodiment in which a continuous reaction tank is employed. Since the base is fed over a separate feed passage from that of the iron salt and alkaline earth metal salt, no base is added to the product (such as iron salt, alkaline earth metal salt, or mixture of iron salt and alkaline earth metal salt) that is being fed over the other lines.

In the manufacturing method according to an aspect of the present invention, a reaction solution containing an iron salt, an alkaline earth metal salt, and a base is stirred and mixed. The stirring is conducted during at least the continual feed period. Conducting the stirring during feeding of the starting material can prevent the pH from becoming nonuniform in portions close to and portions far from the discharge outlet of the feed passage in the reaction solution, and to render the pH uniform in the reaction solution in the reaction tank. To that end, batch reaction tank 10 shown in FIG. 1 is equipped with stirring vanes 14 in addition to the feed passage. However, the method of stirring in the manufacturing method set forth above is not limited to being based on stirring vanes. Various stirring means such as a magnetic stirrer or static mixer can be employed without limitation. Stirring conditions such as the peripheral speed of the stirring vanes and the like are not specifically limited.

The iron salt, alkaline earth metal salt, and base can be fed in solid form or in liquid form. To facilitate homogenizing during mixing in the reaction tank, addition in liquid form is desirable, such as in the form of a suitable water-based solution in which they have been dissolved or in the form of a water-based solution in which they have been dispersed. The concentration of the salt or base in the water-based solution can be suitably set.

Feeding of the iron salt, alkaline earth salt, and base can be begun simultaneously for all three, or begun sequentially in some order. The continual feed period begins when the iron salt and base both become present in the reaction solution in the reaction tank, and the continual feed period ends when feeding of all of the starting materials stops. The time when both the iron salt and the base are present in the reaction solution in the reaction tank can be when feeding of the prereaction solution of either the iron salt or the base to the prereaction solution containing the other begins, the time when feeding of the iron salt and base simultaneously beings to the prereaction solution that does not contain either the iron salt or the base, the time when feeding of the other begins in the case where feeding of either the iron salt or the base is conducted in advance to a prereaction solution containing neither the iron salt or the base, or the like. In the present solution, the term "simultaneously" in regard to the start or stop of feeding is to be construed as including when the start periods slip unintentionally due to the operational precision of the device or the like.

Additionally, feeding of the alkaline earth metal salt to the reaction tank can be begun at any stage. For example, feeding of the alkaline earth metal salt to the reaction tank can be begun either before or after the start of feeding of the iron salt and base, or during a period between the start of feeding of one and the start of feeding of the other. Feeding of the starting materials during the continual feed period can be conducted by continuing the regular feeding (continually feeding), or can be conducted by repeatedly implementing and stopping feeding (intermittently feeding). From the perspective of precise and easy control, continuously feeding the starting materials the feed amount of which per unit time is being controlled is desirable.

In the manufacturing method according to an aspect of the present invention, the amount fed per unit time of at least one from among the iron salt, alkaline earth metal salt, and base is controlled and/or acid is added to the reaction solution in the reaction tank based on the $pH_{before}$, which is the pH of the solution (prereaction solution) in the reaction tank before the start of the continual feed period, so that the pH of the reaction solution in the reaction tank during the continual feed period falls within the range of:

$$pH_{before}-2 \leq pH \leq pH_{before}+2.$$

Control of the amount being fed alone, or the addition of acid alone can be conducted, or both control of the amount being fed and the addition of acid can be conducted in parallel. These can also be conducted in any sequence and repeated as desired.

The amount fed per unit time is not specifically limited. For example, it can refer to the amount fed during any regular interval, such as the amount fed per hour, the amount fed per minute, or the amount fed per second. For a liquid, the amount fed per unit time can also be expressed as a flow rate. Not mixing in the entire amount of starting material at once during preparation of the precursor but rather providing a continual feed period and conducting gradual mixing is thought to mainly contribute to a reduction in the particle size of hexagonal ferrite that is obtained by conversion of a precursor prepared in such a manner. However, when a continual feed period is simply provided and all three of the starting materials are continuously fed in constant amounts, the particles obtained by the conversion of a precursor prepared in this manner end up varying greatly in size, as was discovered due to research conducted by the present inventor. The present inventor attributed this primarily to the strong dependence on pH of the solubility of the starting materials, particularly that of the iron salt. By contrast, research conducted by the present inventor also revealed that the uniformity of the particle size of the hexagonal ferrite obtained by conversion of precursor thus prepared could be enhanced by either controlling the amount being fed or adding an acid, or both, as set forth above. In this context, control of the amount being fed per unit time means varying the amount being fed per unit time, that is, increasing it, reducing it, increasing it then reducing it, or reducing it then increasing it, either continuously or in stages. The amount of the increase or the decrease (that is, the rate of increase or decrease of the amount being fed) can be adjusted as desired so long as the variation in pH is kept to within the desired range.

The acid can be added continuously, intermittently, or at once, desirably over a separate feed passage from that of the starting materials. The acid is as set forth above. To precisely and easily control the pH, the acid is desirably fed as a liquid, but this is not a specific limitation.

To keep the variation in pH during the continual feed period to within the desired range by controlling the amounts being fed and adding acid, the pH of the reaction solution in the reaction tank is desirably regularly monitored during the continual feed period. It is possible to keep the variation in the pH of the reaction solution in the reaction tank to within the desired range by using a known control program to feedback (feedback control) the monitoring results to the operating conditions of the feed pump. When the pH during the continual feed period is kept to within the desired range, the amount of starting material that is fed per unit time is not specifically limited and can be suitably determined based on productivity or the like. This is also true for the amount of acid that is added.

To obtain hexagonal ferrite exhibiting a sharper particle size distribution, the pH of the reaction solution in the reaction tank during the continual feed period is desirably kept to within a range of:

$$pH_{before}-1.5 \leq pH \leq pH_{before}+1.5;$$

preferably kept to within a range of:

$$pH_{before}-1 \leq pH \leq pH_{before}+1;$$

and more preferably kept to within a range of:

$$pH_{before}-0.5 \leq pH \leq pH_{before}+0.5.$$

In one embodiment, the amount being fed per unit time of the base that may be the primary reason for the variation in pH is desirably controlled. In that case, the amount of iron salt that is fed per unit time and the amount of alkaline earth metal salt that is fed per unit time can be changed, or can be kept constant. In one embodiment, from the perspective of achieving a uniform reaction, the amounts of iron salt and alkaline earth metal salt that are fed per unit time are desirably not changed during the continual feed period. In yet another embodiment, the amount of base being fed per unit time is not changed, but the amount of either iron salt or alkaline earth metal salt, or both, per unit time can be changed.

In the embodiment employing a batch reaction tank, once the continual feed period has ended and once optional stirring and mixing have been continued, the precursor-containing water-based solution that is removed from the reaction tank is subjected to a continuous hydrothermal synthesis process to convert the precursor to hexagonal ferrite. In one embodiment, a feed pipe is connected to a batch reaction tank and precursor-containing water-based solution can be fed from the batch reaction tank through the feed pipe directly to the reaction device employing the continuous hydrothermal synthesis process. In yet another embodiment, the precursor-containing water-based solution that is removed from the batch reaction tank is transferred to the solution tank employing the continuous hydrothermal synthesis process, after which the precursor can be converted to hexagonal ferrite by the continuous hydrothermal synthesis process. The details of the continuous hydrothermal synthesis process will be described further below.

In the above, a description has been given of embodiments in which an iron salt, an alkaline earth metal salt, and a base are continually fed to a batch reaction tank. However, what is fed to the reaction tank during the continual feed period is not limited to these three starting materials. For example, neutral water that does not contain acid or base, such as purified water or distilled water and the organic compounds set forth further below, can be fed to the reaction tank during the continual feed period. The amounts of these optional components that are fed per unit time can be suitably set. In the manufacturing method according to an aspect of the present invention, the variation in pH in the reaction tank during the continual feed period is controlled by controlling the amounts of the starting materials that are fed per unit time to the reaction tank as essential components. Thus, the amounts of the optional components that are fed per unit time during the continual feed period can be changed or kept constant without change.

The embodiment employing a continuous reaction tank will be described next.

Figure 2:
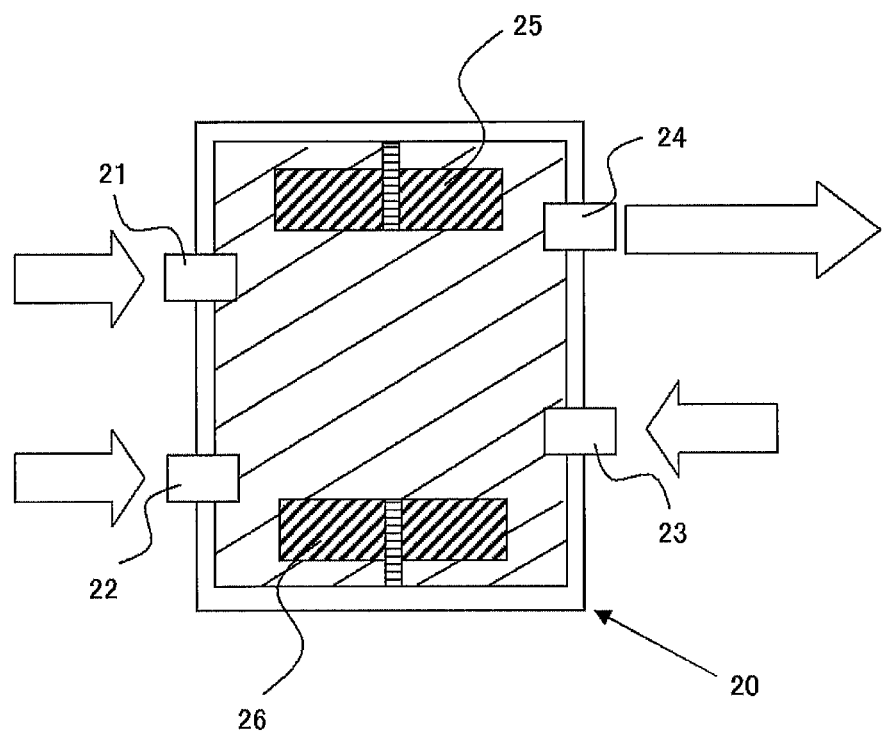
FIG. 2 is a schematic sectional view showing an example of a continuous reaction tank that can be used to prepare the precursor-containing water-based solution.

FIG. 2 shows a schematic sectional view of an example of a continuous reaction tank that can be used to prepare a precursor-containing water-based solution. Continuous reaction tank 20 shown in FIG. 2 is equipped with feed passages 21, 22, and 23 that feed starting materials to the reaction tank. Each of the feed passages is connected to a starting material storage tank, not shown. In the feeding to the continuous reaction tank shown in FIG. 2, the starting materials in the starting material storage tanks are normally fed to the reaction tank by a feed pump, not shown, in the form of solutions. It is possible to control the amounts of starting materials that are fed by changing the flow rate by means of the feed pumps. Continuous reaction tank 20 can be filled with prereaction solution prior to the start of the continual feed period. The prereaction solution is as set forth above. In one embodiment, the iron salt, alkaline earth metal salt, and base are fed to the reaction tank over three feed passages. However, as set forth above, in the above manufacturing method, it suffices to feed at least the base to the reaction tank over a separate feed passage from the iron salt and alkaline earth metal salt. The iron salt and alkaline earth metal salt can be mixed together and then fed to the reaction tank over the same feed passage. Further, as set forth above, water and/or an organic compound can be fed to the reaction tank during the continual feed period.

The continuous reaction tank shown in FIG. 2 is equipped with stirring vanes 25 and 26 in an upper portion and lower portion within the reaction tank. The rotation of stirring vanes 25 and 26 is driven by a motor, not shown, to stir and mix the reaction solution within the reaction tank. The stirring vanes can be directly linked to the motor, or can be magnetically coupled to it. The stirring vanes can be arranged vertically with either one on top. They are desirably disposed vertically. When the stirring vanes are disposed vertically, the vertical stirring directions are desirably the reverse of each other. The details regarding stirring and mixing are as set forth above. The reaction tank shown in FIG. 2 is a continuous reaction tank. Thus, the removal of solution from within the reaction tank is conducted in parallel with the feeding of the starting materials. In the continuous reaction tank 20 shown in FIG. 2, the removal is made through a removal outlet 24. The removal speed is not specifically limited and can be determined by balancing with the amount of starting material being fed (the feed rate).

Additional details about the form employing a continuous reaction tank shown in FIG. 2 are as set forth above for the embodiment employing a batch reaction tank shown in FIG. 1.

The optional components will be described next.

A first example of an optional component is the acid that is optionally added to regulate pH variation. The details are as set forth above.

From the perspective of achieving finer particles and a more uniform particle size in the hexagonal ferrite that is prepared by the continuous hydrothermal synthesis process, the preparation of the above precursor is desirably conducted in the presence of an organic compound. The precursor that is prepared in the presence of an organic compound can be subjected to a conversion reaction to hexagonal ferrite in a state of having been surface coated with the organic compound. Once it has been instantaneously dissolved in a high-temperature, high-pressure system, it can crystallize, which is thought to cause the precipitation of hexagonal ferrite crystals (conversion to hexagonal ferrite). The present inventor surmise that the fact that the organic compound is present near the particles during the period from dissolution to crystallization can contribute to the fine particles and uniform particle size of the hexagonal ferrite particles that crystallize. The fact that aggregation of the precursor can be inhibited and precursor in the form of fine particles with good uniformity of particle size can be obtained by synthesis in the presence of the organic compound is also thought to contribute to obtaining hexagonal ferrite in the form of even finer particles of good uniformity of particle size.

Examples of the organic compound are organic carboxylic acids, organic nitrogen compounds, organic sulfur compounds, organic phosphorus compounds, salts thereof, surfactants, and various polymers. Examples of suitable polymers are those having a weight average molecular weight of about 1,000 to about 100,000. Those exhibiting water solubility are desirable. Examples of desirable polymers are nonionic polymers and hydroxyl group-comprising polymers. Salts of alkali metals are suitable as the above salts. The above weight average molecular weight refers to a value that is measured by gel permeation chromatography (GPC) and converted to a polystyrene value.

Examples of organic carboxylic acids are aliphatic carboxylic acids, alicyclic carboxylic acids, and aromatic carboxylic acids. Aliphatic carboxylic acids are desirable. The aliphatic carboxylic acid may be a saturated aliphatic carboxylic acid or an unsaturated aliphatic carboxylic acid, with an unsaturated carboxylic acid being preferred. The number of carbon atoms of the carboxylic acid is not specifically limited; for example, it can be equal to or more than 2. By way of example, it can be equal to or lower than 24, desirably equal to or lower than 20, preferably equal to or lower than 16. Specific examples of aliphatic carboxylic acids are: oleic acid, linoleic acid, linolenic acid, caprylic acid, capric acid, lauric acid, behenic acid, stearic acid, myristic acid, palmitic acid, myristoleic acid, palmitoleic acid, vaccenic acid, eicosenoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, nonadecanoic acid, icosanoic acid, and acetic acid; as well as dicarboxylic acids such as malonic acid, succinic acid, and adipic acid. However, there is no limitation thereto.

Examples of organic nitrogen compounds are organic amines, organic amide compounds, and nitrogen-containing heterocyclic compounds.

The organic amine can be a primary amine, secondary amine, or tertiary amine. Primary and secondary amines are desirable. Aliphatic amines are an example, as are primary and secondary aliphatic amines. The number of carbon atoms of the amines is not specifically limited; examples are equal to or more than 5 but equal to or lower than 24, desirably equal to or more than 8 and equal to or lower than 20, preferably equal to or more than 12 but equal to or lower than 18. Specific examples of organic amines are alkylamines such as oleylamine, laurylamine, myristylamine, palmitylamine, stearylamine, octylamine, decylamine, dodecylamine, tetradecylamine, hexadecylamine, octadecylamine, and dioctylamine; aromatic amines such as aniline; hydroxyl group-comprising amines such as methylethanolamine and diethanolamine; and derivatives thereof.

Examples of nitrogen-containing heterocyclic compounds are saturated and unsaturated heterocyclic compounds having three to seven-membered rings with 1 to 4 nitrogen atoms. Hetero atoms in the form of sulfur atoms, oxygen atoms, and the like can be contained. Specific examples are pyridine, lutidine, cholidine, and quinolines.

Examples of organic sulfur compounds are organic sulfides, organic sulfoxides, and sulfur-containing heterocyclic compounds. Specific examples are dialkyl sulfides such as dibutyl sulfide; dialkyl sulfoxides such as dimethyl sulfoxide and dibutyl sulfoxide; and sulfur-containing heterocyclic compounds such as thiophene, thiolane, and thiomorpholine.

Examples of organic phosphorus compounds are phosphoric acid esters, phosphines, phosphine oxides, trialkyl phosphines, phosphorous acid esters, phosphonic acid esters, sub-phosphonic acid esters, phosphinic acid esters, and sub-phosphinic acid esters. Examples are tributyl phosphine, trihexyl phosphine, trioctyl phosphine, and other trialkyl phosphines; tributyl phosphine oxide, trihexyl phosphine oxide, trioctyl phosphine oxide (TOPO), tridecyl phosphine oxide, and other trialkyl phosphine oxides.

Examples of polymers and surfactants are polyethylene glycol, polyoxyethylene (1) lauryl ether phosphate, lauryl ether phosphate, sodium polyphosphate, sodium bis(2-ethylhexyl)sulfosuccinate, sodium dodecylbenzene sulfonate, polyacrylic acid and its salts, polymethacryic acid and its salts, polyvinyl alcohol, other hydroxyl group-comprising polymers, polyvinyl pyrrolidone, other nonionic polymers, and hydroxyethyl cellulose. Any from among cationic, anionic, and nonionic surfactants, as well as amphoteric surfactants, can be employed. Anionic surfactants are desirable.

In an embodiment, the above organic compound need only be present in the reaction solution along with the starting material compounds of the precursor. The sequence of mixing with the starting materials of the precursor is not specifically limited. The organic compound can also be mixed with the prereaction solution. When the organic compound is fed to the reaction tank during the continual feed period, it is desirably fed to the reaction tank in the form of a solution or a suspension from the perspective of more effectively inhibiting aggregation of the precursor in the synthesis reaction. Solvents that can be used in solutions and suspensions are as set forth above.

The amount of organic compound employed desirably falls within a range of 0.01 weight part to 1,000 weight parts per 100 weight parts of precursor, preferably falls within a range of 0.05 weight part to 500 weight parts, and more preferably falls within a range of 0.1 weight part to 300 weight parts. The quantity of precursor serving as a reference here can be a measured value or the theoretically produced value based on the amount of starting materials charged. The same applies to the value set forth as a reference for the amount of precursor below.

Subjecting the precursor obtained by the steps set forth above to a continuous hydrothermal synthesis process can yield hexagonal ferrite in the form of fine particles presenting a sharp particle size distribution.

<Conversion of Precursor into Hexagonal Ferrite>

The precursor-containing water-based solution is fed to a reaction flow passage that can pressurize and heat the fluid flowing through it. In this reaction flow passage, the water-based solution containing the hexagonal ferrite precursor is heated and pressurized. The water it contains is put in a state of high temperature and high pressure, desirably in a subcritical to supercritical state. That can cause the hexagonal ferrite precursor to undergo a reaction (ferrite conversion) that can convert it to ferrite. As a result, hexagonal ferrite can be obtained. Generally, a fluid containing water as the solvent can be heated to equal to or higher than 300° C. and pressurized to equal to or higher than 20 MPa, putting the water contained in the fluid into a subcritical to supercritical state.

The following are examples of specific embodiments of the process of converting the hexagonal ferrite precursor to hexagonal ferrite.

(1) A water-based solution containing hexagonal ferrite precursor is continuously fed to a reaction flow passage that heats the fluid flowing through it to equal to or higher than 300° C. and pressurizes the fluid to a pressure of equal to or higher than 20 MPa, thereby converting the hexagonal ferrite precursor to hexagonal ferrite within the reaction flow passage.

(2) After the water-based solution containing the particles of hexagonal ferrite precursor has been mixed with heated and pressurized water, desirably water that has been heated to equal to or higher than 200° C. and subjected to a pressure of equal to or higher than 20 MPa, it is continuously fed to a reaction flow passage that heats the fluid flowing through it to equal to or higher than 300° C. and subjects the fluid to a pressure of equal to or higher than 20 MPa, thereby converting the hexagonal ferrite precursor to hexagonal ferrite.

Embodiment (2) differs from embodiment (1) in that the heated and pressurized water is brought into contact with the water-based solution containing the hexagonal ferrite precursor, while, in embodiment (1), the water-based solution containing the hexagonal ferrite precursor is heated and pressurized to a subcritical to supercritical state. For example, a water-based solution containing a hexagonal ferrite precursor can be added to a liquid feed passage to which heated and pressurized water is being continuously fed to bring the water-based solution into contact with the heated and pressurized water. In embodiment (2), because the hexagonal ferrite precursor can be instantaneously placed in a highly reactive state by bringing it into contact with heated and pressurized water, the conversion to ferrite can take place sooner, which is advantageous. Generally, water assumes a highly reactive subcritical to supercritical state when heated to equal to or higher than 200° C. and pressurized to equal to or higher than 20 MPa. Accordingly, in embodiment (2), the water is desirably heated to a temperature of equal to or higher than 200° C. and subjected to a pressure of equal to or higher than 20 MPa.

Treating hexagonal ferrite magnetic particles with an organic modifying agent is an effective means of preventing aggregation between particles. As is described in Japanese Unexamined Patent Publication (KOKAI) No. 2009-208969, which is expressly incorporated herein by reference in its entirety, in one embodiment, such an organic modifying agent can be added to the reaction system once the conversion to ferrite has begun.

In another embodiment, the organic modifying agent can be added to the water-based solution containing the hexagonal ferrite precursor, after which the mixture is subjected to the process of embodiment (1) or embodiment (2) above. Thus, the organic modifying agent can adhere to the hexagonal ferrite precursor particles, thereby effectively preventing the aggregation of particles and yielding an extremely fine magnetic powder. The organic compounds set forth above can be employed as the organic modifying agent.

The above organic modifying agent is desirably admixed in an amount of about 1 weight part to 1,000 weight parts per 100 weight parts of hexagonal ferrite precursor. This makes it possible to more effectively inhibit particle aggregation. The organic modifying agent can be added as is to the water-based solution containing the hexagonal ferrite precursor, and addition of the organic modifying agent as a solution in a solvent (organic modifying agent solution) is desirable to obtain hexagonal ferrite powder of fine particles. A solvent in the form of water or water and an organic solvent that is miscible with water or hydrophilic is desirable. The various solvents set forth above are examples of organic solvents.

The organic modifying agent can be mixed in in batch form or continuously. Doing so continuously with subsequent steps can enhance productivity, so continuous mixing in is desirable.

Figure 3:
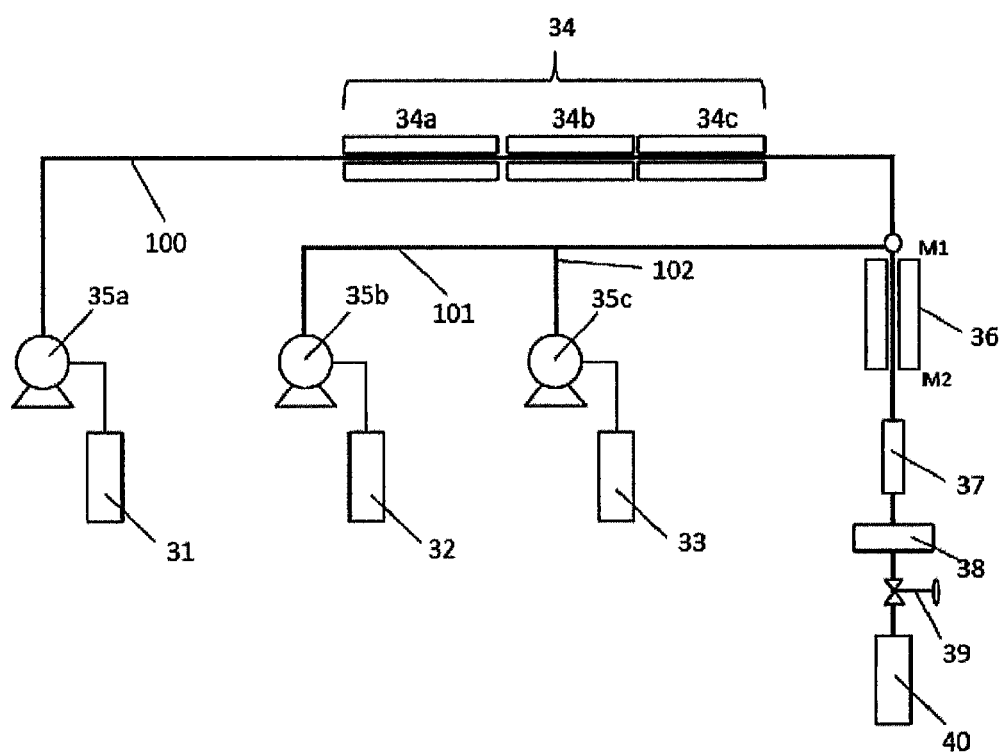
FIG. 3 is a schematic descriptive drawing of an example of a manufacturing device suited to the continuous hydrothermal synthesis process.

FIG. 3 is a schematic descriptive drawing of a manufacturing device that is suited to the continuous hydrothermal synthesis process. An example of a specific embodiment of the method of manufacturing hexagonal ferrite powder according to an aspect of the present invention will be described based on FIG. 3. However, the present invention is not limited to the embodiment set forth below.

The manufacturing device shown in FIG. 3 comprises liquid tanks 31, 32 and 33; a heating means 34 (34a to 34c); pressurized liquid feeding means 35a, 35b, and 35c; a reaction flow passage 36; a cooling element 37; a filtering means 38; a pressure regulating valve 39; and a recovery element 40. Fluid is fed from the various liquid tanks by pipes 100, 101, and 102.

In one embodiment, water such as purified water or distilled water is introduced to liquid tank 31, an aqueous solution containing hexagonal ferrite precursor is introduced to liquid tank 32, and an organic modifying agent solution is introduced to liquid tank 33. The water that is introduced to liquid tank 31 is fed through pipe 100 while being pressurized by pressurized liquid feeding means 35a, and heated by heating means 34 to put the water in a subcritical to supercritical state, in which it arrives at mixing element M1.

The aqueous solution containing hexagonal ferrite precursor that has been fed through pipe 101 by pressurized liquid feeding means 35b from liquid tank 32 converges with the organic modifying agent solution that has been fed through pipe 102 by pressurized liquid feeding means 35c from liquid tank 33, and arrives at mixing element M1.

Prior to arriving at mixing element M1, the organic modifying agent desirably adheres to the surface of the hexagonal ferrite precursor. It is advantageous in terms of obtaining fine particles of hexagonal ferrite to make the organic modifying agent adhere to the hexagonal ferrite precursor in this manner prior to bringing it into contact with the water in a subcritical to supercritical state. To this end, water, or an organic solvent that is miscible with water or hydrophilic is desirably employed as the solvent of the organic modifying agent solution.

Next, the water-based solution containing the hexagonal ferrite precursor is brought into contact with the water in a subcritical to supercritical state in mixing element M1 to start converting the precursor to ferrite. Subsequently, it is heated in reaction flow passage 36 and further pressurized by pressurizing means 35a to cause the water contained in the reaction system within reaction flow passage 36 to enter a subcritical to supercritical state and further advance conversion of the precursor to ferrite. Subsequently, solution containing hexagonal ferrite particles obtained by the conversion of hexagonal ferrite precursor to ferrite is discharged through discharge outlet M2. The discharged solution is cooled by mixing with cold water in cooling element 37, after which the hexagonal ferrite are collected by filtering means 38 (a filter or the like). The hexagonal ferrite magnetic particles that have been collected by filtering means 38 are released by filtering means 38, pass through pressure regulating valve 39, and are recovered in recovery element 410.

In the above method, since pressure is applied to the fluid that is fed to the interior, high-pressure metal pipe is desirably employed as the piping. Due to low corrosion, a stainless steel such as SUS316 or SUS304, or a nickel-based alloy such as Inconel (registered trademark in Japan) or Hastelloy (registered trademark in Japan), is desirably employed as the metal constituting the piping. However, there is no limitation to these materials, and an equivalent or similar material can also be employed. Piping of the laminate configuration described in Japanese Unexamined Patent Publication (KOKAI) No. 2010-104928, which is expressly incorporated herein by reference in its entirety, can also be employed.

In the manufacturing device shown in FIG. 3, the water in a subcritical to supercritical state and the water-based solution containing hexagonal ferrite precursor are mixed together in a mixing element M1 where the pipes are joined by a T-shaped joint. However, it is also possible to employ a reactor such as that employed in Japanese Unexamined Patent Publication (KOKAI) No. 2007-268503, 2008-12453, or 2010-75914, which are expressly incorporated herein by reference in their entirety. The reactor material is desirably that described in Japanese Unexamined Patent Publication (KOKAI) No. 2007-268503, 2008-12453, or 2010-75914. Specifically, the metal constituting the piping is desirably one of the above-described metals. However, it is not limited to them; an equivalent or similar material can be employed. Combination with a low-corrosion titanium alloy, tantalum alloy, ceramic, or the like is also possible.

A process whereby an organic modifying agent is added to a water-based solution containing hexagonal ferrite precursor, after which the process of embodiment (2) above is conducted to obtain hexagonal ferrite modified with an organic modifying agent is described above. However, it is also possible to apply the process of embodiment (1) above after adding an organic modifying agent to the water-based solution containing the hexagonal ferrite precursor.

The reaction system in which water is present can be heated to equal to or higher than 300° C. and pressurized to equal to or higher than 20 MPa to put the water in a subcritical to supercritical state to create a reaction site of extremely high reactivity. Placing the hexagonal ferrite precursor in this state can cause the conversion to ferrite to advance rapidly, yielding hexagonal ferrite.

A heating temperature of equal to or higher than 300° C. within the reaction system is desirable, and the heating temperature falling within a range of 350° C. to 500° C. is preferable. The pressure that is applied to the reaction system is desirably equal to or higher than 20 MPa as set forth above, preferably falling within a range of 20 MPa to 50 MPa.

Some specific embodiments of the method of manufacturing hexagonal ferrite powder according to an aspect of the present invention have been described above. However, the present invention is not limited to the specific embodiments.

Hexagonal Ferrite Powder

A further aspect of he present invention relates to hexagonal ferrite powder manufactured by the manufacturing method set forth above.

The above-described manufacturing method can yield hexagonal ferrite powder in the form of fine particles of good particle size uniformity by the continuous hydrothermal synthesis process. For example, the above hexagonal ferrite can be fine powder with an average particle size of equal to or less than 35 nm exhibiting a sharp particle size distribution with a coefficient of variation in particle size of equal to or less than 25 percent. The average particle size is preferably equal to or less than 30 nm, more preferably equal to or less than 20 nm. The coefficient of variation in particle size is preferably equal to or less than 20 percent. By way of example, the average particle size can be equal to or greater than 5 nm, equal to or greater than 10 nm, or equal to or greater than 15 nm. By way of example, the coefficient of variation in particle size can be equal to or greater than 10 percent, or equal to or greater than 15 percent. However, the smaller the average particle size and the coefficient of variation in the particle size, the better. Hexagonal ferrite powder in the form of fine particles of good uniformity of particle size is useful in various fields, including the field of magnetic recording.

The shape of the particles of hexagonal ferrite powder is not specifically limited. Any shape is possible, such as platelike, spherical, elliptical, or acicular. In this context, the term "platelike" is a shape having a main surface. The term "main surface" refers to the outer surface that occupies the greatest area on the particle. For example, in a particle of hexagonal planar shape, the surface occupying the greatest area is the outer hexagonal surface; this portion is referred to as the main surface. Particles such that the ratio of the average major axis length to the average minor axis length (average major axis length/average minor axis length) as determined for 500 particles by the method set forth above is equal to or greater than 1 but equal to or less than 2, desirably equal to or greater than 1 but equal to or less than 1.5, are defined as isotropic particles. The case where this ratio is equal to or less than 1.2 is defined as spherical and the case where it is greater than 1.2 is defined as aspherical (elliptical to acicular). In magnetic recording media, the magnetic powder is desirably isotropic particles to achieve better high-density recording by raising the fill rate of the magnetic powder in the magnetic layer.

Magnetic Recording Medium

A further aspect of the the present invention relates to a magnetic recording medium, which comprises a magnetic layer comprising ferromagnetic powder and binder on a nonmagnetic support, wherein the ferromagnetic powder is the hexagonal ferrite powder according to an aspect of the present invention set forth above. The hexagonal ferrite powder according to an aspect of the present invention can yield fine powder of good uniformity of particle size. Thus, the use of the hexagonal ferrite powder as the ferromagnetic powder of the magnetic layer can provide a magnetic recording medium of good electromagnetic characteristics.

The magnetic recording medium according to an aspect of the present invention will be further described below.

Magnetic Layer

Details of the ferromagnetic powder that is employed in the magnetic layer, and of the method of manufacturing it, are as set forth above.

The magnetic layer contains ferromagnetic powder and binder. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0029 to 0031 of Japanese Unexamined Patent Publication (KOKAI) No. 2010-24113, which is expressly incorporated herein by reference in its entirety, with regard to the above binders. Polyisocyanate curing agents can also be employed with the above resins.

Additives can be added as needed to the magnetic layer. Examples of additives are abrasives, lubricants, dispersing agents, dispersion adjuvants, antifungal agents, antistatic agents, oxidation inhibitors, solvents, and carbon black. The additives set forth above can be suitably selected for use from among commercial products based on the properties desired.

Nonmagnetic Layer

The contents of the nonmagnetic layer will be described in detail next. The magnetic recording medium of an aspect of the present invention can comprise a nonmagnetic layer containing nonmagnetic powder and binder between the nonmagnetic support and the magnetic layer. The nonmagnetic powder that is employed in the nonmagnetic layer can be an organic or an inorganic material. Carbon black and the like can also be employed. Examples of inorganic materials are metals, metal oxides, metal carbonates, metal sulfates, metal nitrides, metal carbides, and metal sulfides. Nonmagnetic powders of these materials are available as commercial products and can be manufactured by known methods. For details, reference can be made to Japanese Unexamined Patent Publication (KOKAI) No. 2010-24113, paragraphs 0036 to 0039.

The binders, lubricants, dispersing agents, additives, solvents, dispersion methods, and the like of the magnetic layer are also suitable for use for the nonmagnetic layer. Techniques that are known for magnetic layers can also be applied to the quantity and type of binder, the quantities and types of additives and dispersing agents added, and the like. Carbon black and organic material powders can also be added to the nonmagnetic layer. In this regard, by way of example, reference can be made to Japanese Unexamined Patent Publication (KOKAI) No. 2010-24113, paragraphs 0040 to 0042.

Nonmagnetic Support

Examples of nonmagnetic supports are known supports such as biaxially stretched polyethylene terephthalate, polyethylene naphthalate, polyamide, polyamide-imide, and aromatic polyamide. Among these, polyethylene terephthalate, polyethylene naphthalate, and polyamide are desirable.

These supports can be subjected in advance to corona discharge, plasma treatment, adhesion-enhancing treatment, heat treatment, or the like. The surface roughness of a nonmagnetic support that is suited to use in the present invention is desirably a center average roughness Ra of 3 nm to 10 nm at a cutoff value of 0.25 mm.

Layer Structure

In the thickness structure of the magnetic recording medium according to an aspect of the present invention, the thickness of the nonmagnetic support is desirably 3 μm to 80 μm. The thickness of the magnetic layer can be optimized based on the amount of saturation magnetization of the magnetic head employed, the length of the head gap, and the bandwidth of the recording signal. Generally, it can be 0.01 µm to 0.15 µm, desirably 0.02 µm to 0.12 µm, and preferably, 0.03 µm to 0.10 µm. It suffices for the magnetic layer to be comprised of a least one layer, but it can separated into two or more layers having different magnetic characteristics. The structures of known multilayer magnetic layers can be applied.

The thickness of the nonmagnetic layer is for example 0.1 µm to 3.0 µm, desirably 0.3 µm to 2.0 µm, and preferably 0.5 µm to 1.5 µm. The nonmagnetic layer of a magnetic recording medium according to an aspect of the present invention includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT, a coercive force of equal to or less than 7.96 kA/m (100 Oe), or a residual magnetic flux density of equal to or less than 10 mT and a coercive force of equal to or less than 7.96 kA/m (100 Oe). The nonmagnetic desirably has no residual magnetic flux density or coercive force.

Backcoat Layer

A backcoat layer can be provided on the opposite surface of the nonmagnetic support from that on which the magnetic layer is present in the magnetic recording medium. The backcoat layer desirably comprises carbon black and inorganic powder. The formula of the magnetic layer and nonmagnetic layer can be applied to the binder and various additives used to form the backcoat layer. The thickness of the back coat layer is desirably equal to or less than 0.9 µm, preferably 0.1 µm to 0.7 µm.

Manufacturing Method

The process of manufacturing the coating liquid for forming the magnetic layer, nonmagnetic layer, or backcoat layer normally comprises at least a kneading step, dispersing step, and mixing steps provided as needed before and after these steps. The various steps can each be divided into two or more steps. All of the starting materials employed in the present invention, such as ferromagnetic powder, nonmagnetic powder, binder, carbon black, abrasives, antistatic agents, lubricants, and solvents, can be added either initially during the step or part way through. Any individual starting material can be divided for addition in two or more steps. For example, polyurethane can be divided up and added during a kneading step, dispersing step, or mixing step following dispersion to adjust the viscosity. In an aspect of the present invention, conventionally known manufacturing techniques can be employed for some of the steps. In the kneading step, it is desirable to employ an apparatus with powerful kneading strength in the kneading step, such as an open kneader, continuous kneader, pressurizing kneader, or extruder. Details on these kneading treatments are described in Japanese Unexamined Patent Publication (KOKAI) Heisei No. 1-106338 and Heisei No. 1-79274, which are expressly incorporated herein by reference in their entirety. Glass beads can also be used to disperse the magnetic layer coating liquid, nonmagnetic layer coating liquid, or backcoat layer coating liquid. High specific gravity dispersing beads in the form of zirconia beads, titania beads, and steel beads are also suitable. The particle diameter and packing rate of these dispersing beads can be optimized for use. A known dispersing apparatus can be employed. For details on methods of manufacturing magnetic recording media, reference can be made to Japanese Unexamined Patent Publication (KOKAI) No. 2010-24113, paragraphs 0051 to 0057, for example.

The magnetic recording medium according to an aspect of the present invention set forth above can afford good electromagnetic characteristics in the high-density recording by containing the above hexagonal ferrite powder in the magnetic layer thereof. Thus, it is suitable as a high-capacity magnetic recording medium such as a backup tape.

EXAMPLES

The present invention will be described in greater detail below through Examples. However, the present invention is not limited to the embodiments shown in Examples. The "parts" and "percent" indicated below denote "weight parts" and "weight percent," respectively. Unless specifically stated otherwise, the steps and evaluations set forth below were conducted in air at 23° C.±1° C.

The pH described further below is a value that was measured with a pH-meter mounted in the reaction tank. The pH during the continual feed period was constantly monitored by the pH-meter.

The X-ray diffraction analysis (XRD measurement) mentioned further below was conducted by scanning CuKα rays under conditions of 45 kV and 40 mA to measure an XRD pattern.

The average particle size and coefficient of variation in particle size of the hexagonal ferrite mentioned further below were determined by the method set forth above using an electron microscope in the form of a model H-9000 Hitachi transmission electron microscope.

1. Examples and Comparative Examples Relating to the Hexagonal Ferrite Powder (Magnetic Powder)

Examples 1-1 to 1-3

(1) Preparation of Precursor-Containing Aqueous Solution

A precursor-containing water-based solution was prepared by the method set forth further below using the batch reaction tank 10 schematically shown in FIG. 1. In the process set forth below, the solution temperature in the reaction tank was controlled by a heater so as to be maintained at 30° C. During the period from the start of feeding of the water-based solution to the end, stirring was continuously conducted by stirring vanes 14.

Purified water that had been adjusted to the pH value shown in Table 1-1 with an acid or a base was employed as the prereaction solution in reaction tank 10.

A barium hydroxide water-based solution prepared by adding 1.6 g of barium hydroxide octahydrate (Ba(OH)$_2$.8H$_2$O) per 100 g of purified water was fed by a feed pump from a storage tank over feed passage 11; an iron (III) hydroxide water-based solution prepared by adding 4.1 g of iron (III) nitrate nonahydrate (Fe(NO$_3$)$_3$.9H$_2$O) per 100 g of purified water was fed by a feed pump from a storage tank over feed passage 12; and a potassium hydroxide water-based solution of 1 mol/L concentration was fed from a storage tank over feed passage 13 to begin feeding to reaction tank 10. The feeding to the reaction tank of the three water-based solutions was simultaneously conducted by setting an operation program for the feed pumps. The feeding of the three water-based solution was continuously conducted from start to finish of feeding without stopping. The amount of the water-based solution of barium hydroxide and the amount of the water-based solution of iron (III) nitrate that were fed per unit time were both set to a flow rate of 25 mL/min and kept constant during feeding (solution feeding). By contrast, the flow rate of the water-based solution of potassium hydroxide was controlled by means of a program (feedback control program) that fed back the results of pH monitoring and controlled the flow rate, repeatedly increasing and decreasing it within a range of about 5.0 mL/min to about 10.0 mL/min.

Subsequently, the feeding of the three water-based solutions to reaction tank 10 was simultaneously stopped. This yielded a precursor-containing water-based solution (hydroxide sol).

The maximum value of the difference between the pH that was continually monitored during feeding to reaction tank 10 and the pH of the prereaction solution, and the pH at the time feeding was stopped, are given in Table 1-1.

(2) Preparation of Hexagonal Ferrite (Barium Ferrite Nanoparticles) by the Continuous Hydrothermal Synthesis Process The water-based solution (sol) prepared in (1) above was introduced to solution tank 32 of the manufacturing device shown in FIG. 3. SUS316BA tube was employed as the pipe of the manufacturing device.

High-temperature, high-pressure water was caused to flow through pipe 100 by heating with heater 34 while feeding purified water that had been introduced into solution tank 31 with a high pressure pump 5a. In this process, the temperature and the pressure were controlled so that the temperature of the high-temperature, high-pressure water after passing through heating means 34c was 450° C. and the pressure was 30 MPa. In the present Example, no solution was introduced into solution tank 33; the merging port between pipe 102 and pipe 101 was sealed by a sealing valve, not shown.

Additionally, the water-based solution (sol) was fed to pipe 101 at 25° C. with a high-pressure pump 35b and mixed with the above high-temperature, high-pressure water in mixing element M1. Subsequently, the mixture was heated and pressurized at 400° C. and 30 MPa in in reaction flow passage 36 to synthesize barium ferrite nanoparticles.

Following synthesis of the barium ferrite nanoparticles, the solution containing the barium ferrite nanoparticles was cooled with cold water in cooling element 37 and the particles were collected.

The collected particles were washed with ethanol and then centrifuged to separate out the barium ferrite nanoparticles.

Example 1-4

A precursor-containing water-based solution was prepared by the method set forth below using the continuous reaction tank 20 schematically shown in FIG. 2. In the process set forth below, the temperature was controlled with a heater so that the solution temperature in the reaction tank was maintained at 30° C. From the start to the end of feeding of the water-based solution below, stirring was continuously conducted with stirring vanes 25 and 26. Stirring vanes 25 and stirring vanes 26 were rotated in opposite directions.

The pH of the purified water in reaction tank 20 was adjusted to the value shown in Table 1-1 as the prereaction solution using an acid or a base.

Feeding to reaction tank 20 was begun by feeding purified water over feed passage 21; a mixed solution prepared by adding 7.9 g of barium hydroxide octahydrate (Ba(OH)$_2$.8H$_2$O) and 20.1 g of iron (III) nitrate nonahydrate (Fe(NO$_3$)$_3$.9H$_2$O) per 100 g of purified water over feed passage 22; and a potassium hydroxide aqueous solution of 1 mol/L concentration over feed passage 23 from storage tanks by means of feed pumps. The feeding of the purified water and the above two aqueous solutions to the reaction tank was simultaneously conducted by setting the operation programs of feed pumps. The feeding of purified water and the two aqueous solutions above was continuously conducted without stopping from the start to the end of feeding.

The feeding of purified water over feed passage 21 was continually conducted at a flow rate during feeding (solution feeding) of 75 mL/min and feeding of mixed solution over feed passage 22 was continually conducted at a flow rate of 10 mL/min. The above flow rates were kept constant during the feeding. By contrast, the flow rate of the barium hydroxide aqueous solution was controlled by means of a program (feedback control program) that fed back the results of pH monitoring and controlled the flow rate, repeatedly increasing and decreasing the flow rate within a range of about 10.0 mL/min to about 20.0 mL/min.

From the start of feeding to the end of feeding five minutes later, removal of the solution from removal outlet 24 was conducted within a flow rate range (the change in flow rate of the barium hydroxide aqueous solution was fed back and the flow rate during removal was varied) of 95 mL/min to 105 mL/min during removal.

The solution that was removed from removal outlet 24 passed through a pipe and was introduced to solution tank 32 of the manufacturing device 30 for continuous hydrothermal synthesis processing shown in FIG. 3 so that solution tank 32 was filled with precursor-containing water-based solution (hydroxide sol).

The subsequent continuous hydrothermal synthesis process was implemented in the same manner as for Examples 1-1 to 1-4.

The maximum difference in value of the pH that was continually monitored during feeding to reaction tank 20 and the pH of the prereaction solution, and the pH at the end of feeding, are given in Table 1-1.

The preparation of hexagonal ferrite by the subsequent continuous hydrothermal synthesis process was conducted in the same manner as in the above Examples.

Comparative Examples 1-1, 1-2

With the exceptions that the pH of the prereaction solution was changed to the values shown in Table 1-1 and the setting of the feedback control program was changed to broaden the pH variation range that was permitted by the program, the same operations were carried out as in the above Examples to prepare precursor-containing water-based solutions.

The maximum difference in the value between the pH that was continually monitored during feeding to reaction tank 10 and the pH of the prereaction solution, and the pH at the end of feeding, are given in Table 1-1.

The subsequent preparation of hexagonal ferrite by the continuous hydrothermal synthesis process was conducted in the same manner as in the above Examples.

Comparative Example 1-3

To purified water filling reaction tank 10 were added 2.0 g of barium hydroxide octahydrate (Ba(OH)$_2$.8H$_2$O) and 0.8 g of iron (III) nitrate nonahydrate (Fe(NO$_3$)$_3$.9H$_2$O) per 100 g of purified water and the mixture was stirred at a solution temperature of 30° C. To the aqueous solution thus prepared was fed a potassium hydroxide aqueous solution of 1 mol/L concentration over feed passage 13 at a constant flow rate (flow rate 7.5 mL/min).

The maximum difference in the value between the pH that was continually monitored during feeding to reaction tank 10 and the pH of the prereaction solution, and the pH at the end of feeding, are given in Table 1-1.

The subsequent preparation of hexagonal ferrite by the continuous hydrothermal synthesis process was conducted in the same manner as in the above Examples.

Comparative Example 1-4

To purified water filling reaction tank 10 was added 4.0 g of iron (III) nitrate nonahydrate (Fe(NO$_3$)$_3$.9H$_2$O) per 100 g of purified water and the mixture was stirred at a solution temperature of 30° C. To the aqueous solution thus prepared was fed a potassium hydroxide aqueous solution of 1 mol/L concentration over feed passage 13 at a constant flow rate (flow rate 7.5 mL/min). After stopping the feeding of potassium hydroxide aqueous solution, 1.6 g of barium hydroxide octahydrate ($Ba(OH)_2.8H_2O$) per 100 g of purified water was added to prepare a potassium hydroxide aqueous solution. This solution was fed over feed passage 11 at a constant flow rate (flow rate 25 mL/min).

The maximum difference in the value between the pH that was continually monitored during the feeding of potassium hydroxide aqueous solution and barium hydroxide aqueous solution to reaction tank 10, the difference between the maximum value and the pH of the prereaction solution prior to the start of feeding, and the pH at the end of feeding are given in Table 1-1.

The subsequent preparation of hexagonal ferrite by the continuous hydrothermal synthesis process was conducted in the same manner as in the above Examples.

X-ray diffraction analysis of the particles obtained in the above Examples and Comparative Examples revealed them to be hexagonal ferrite (barium ferrite). Based on the average particle size, coefficient of variation in particle size, and results of particle size measurement of the hexagonal ferrite nanoparticles obtained, the shape of the particles was determined to be as shown in Table 1-2.

manufacturing device shown in FIG. 3. SUS316BA tube was employed as the pipe of the manufacturing device.

Purified water that had been introduced into solution tank 31 was heated by heater 34 while being fed to high-pressure pump 35*a* to cause high-temperature, high-pressure water to flow through pipe 100. In this process, the temperature and the pressure were controlled so that the temperature of the high-temperature, high-pressure water after passing through heating means 34*c* was 450° C. and the pressure was 30 MPa.

The precursor-containing aqueous solution and the organic modifying agent solution were fed into pipes 101 and 102 at 25° C. by high-pressure pumps 35*b* and 35*c*, respectively, so that the volumetric ratio of precursor-containing aqueous solution:organic modifying agent solution was 5:5 and the two solutions were mixed along the way. The mixed solution that was obtained was mixed with the above high-temperature, high-pressure water in mixing element M1. Subsequently, the mixture was heated to 400° C. and pressurized to 10 MPa for 10 seconds in reaction flow passage 36 to synthesize barium ferrite nanoparticles.

Following the synthesis of barium ferrite nanoparticles, the solution containing the barium ferrite nanoparticles was cooled with cold water in cooling element 7 and the particles were collected.

The collected particles were washed with ethanol and then centrifuged to separate barium ferrite nanoparticles modified with oleic acid.

TABLE 1-1

|  | Ex. 1-1 | Ex. 1-2 | Ex. 1-3 | Ex. 1-4 | Comp. Ex. 1-1 | Comp. Ex. 1-2 | Comp. Ex. 1-3 | Comp. Ex. 1-4 |
|---|---|---|---|---|---|---|---|---|
| pH of prereaction solution | 8.3 | 10.2 | 12.1 | 12.0 | 8.7 | 12.3 | 2.4 | 2.0 |
| pH at the end of feeding | 8.7 | 10.4 | 12.2 | 12.3 | 11.8 | 9.8 | 12.2 | 12.2 |
| Maximum value of difference between pH during feeding and pH of prereaction solution | 1.1 | 0.7 | 0.3 | 0.4 | 3.1 | 2.5 | 10.2 | 10.0 |
| Preparation method of precursor aqueous solution | Batch-type | Batch-type | Batch-type | Continuous-type | Batch-type | Batch-type | Batch-type | Batch-type |

TABLE 1-2

|  | Ex. 1-1 | Ex. 1-2 | Ex. 1-3 | Ex. 1-4 | Comp. Ex. 1-1 | Comp. Ex. 1-2 | Comp. Ex. 1-3 | Comp. Ex. 1-4 |
|---|---|---|---|---|---|---|---|---|
| Average particle size of barium ferrite nanoparticles[nm] | 33.5 | 29.0 | 24.5 | 23.0 | 29.5 | 31.0 | 36.5 | 28.5 |
| Coefficient of variation in particle size of nanoparticles [%] | 22.0 | 20.5 | 19.0 | 16.5 | 31.0 | 29.5 | 33.5 | 30.5 |
| Shape | Platelike shape | Platelike shape | Platelike shape | Platelike shape | Platelike shape | Platelike shape | Platelike shape | Platelike shape |

Examples 2-1 to 2-4

(1) Preparation of Precursor-Containing Aqueous Solutions

Precursor-containing aqueous solutions (hydroxide sols) were prepared by the same method as in Examples 1-1 to 1-4.

(2) Preparation of Hexagonal Ferrite (Barium Ferrite Nanoparticles) by the Continuous Hydrothermal Synthesis Process Oleic acid was dissolved in ethanol to prepare an organic modifying agent solution. The concentration of the solution prepared was 0.2 M.

The aqueous solution (sol) prepared in (1) above was introduced into solution tank 32 and the organic modifying agent solution was introduced into solution tank 33 of the Comparative Examples 2-1 to 2-4

With the exception that precursor-containing aqueous solutions (hydroxide sols) were prepared by the same method as in Comparative Examples 1-1 to 1-4, barium ferrite nanoparticles were obtained by the same operation as in the above Examples.

X-ray diffraction analysis of the particles obtained in the above Examples and Comparative Examples revealed them to be hexagonal ferrite (barium ferrite). Based on the average particle size, coefficient of variation in particle size, and results of particle size measurement of the hexagonal ferrite nanoparticles obtained, the shape of the particles was determined to be as shown in Table 2.

TABLE 2

|  | Ex. 2-1 | Ex. 2-2 | Ex. 2-3 | Ex. 2-4 | Comp. Ex. 2-1 | Comp. Ex. 2-2 | Comp. Ex. 2-3 | Comp. Ex. 2-4 |
|---|---|---|---|---|---|---|---|---|
| Preparation method of precursor aqueous solution | Same as Ex. 1-1 | Same as Ex. 1-2 | Same as Ex. 1-3 | Same as Ex. 1-4 | Same as Comp. Ex. 1-1 | Same as Comp. Ex. 1-2 | Same as Comp. Ex. 1-3 | Same as Comp. Ex. 1-4 |
| Average particle size of barium ferrite nanoparticles [nm] | 22.5 | 19.5 | 18.0 | 17.5 | 21.0 | 22.0 | 24.5 | 20 |
| Coefficient of variation in particle size of nanoparticles [%] | 23.0 | 21.5 | 19.5 | 17.0 | 33.0 | 31.0 | 35.0 | 28.5 |
| Shape | Spherical shape | Spherical shape | Spherical shape | Spherical shape | Spherical shape | Spherical shape | Spherical shape | Spherical shape |

Example 3-1

With the exceptions that 16.0 g of potassium oleate was added to the prereaction solution; a feed passage (referred to as the "additional feed passage", hereinafter) was added to feed organic compound-containing aqueous solution to batch reaction tank 10 that is schematically shown in FIG. 1; a 19% concentration of potassium oleate aqueous solution was fed at a constant flow rate of 17 mL/min over the additional feed passage simultaneously with the start of feeding of the above three starting material solutions; and feeding of the potassium oleate aqueous solution was ended simultaneously with the end of the feeding of the three starting material solutions, barium ferrite nanoparticles were obtained by the same operation as in Example 1-1.

Example 3-2

With the exception that potassium oleate aqueous solution was fed in the same manner as in Example 3-1, barium ferrite nanoparticles were obtained by the same operation as in Example 1-2.

Example 3-3

With the exception that potassium oleate aqueous solution was fed in the same manner as in Example 3-1, barium ferrite nanoparticles were obtained by the same operation as in Example 1-3.

Comparative Example 3-1

With the exception that potassium oleate aqueous solution was fed in the same manner as in Example 3-1, barium ferrite nanoparticles were obtained by the same operation as in Comparative Example 1-1.

Comparative Example 3-2

With the exception that potassium oleate aqueous solution was fed in the same manner as in Example 3-1, barium ferrite nanoparticles were obtained by the same operation as in Comparative Example 1-2.

In the above Examples and Comparative Examples, the maximum values of the difference between the pH that was continually monitored in the feeding to reaction tank 10 and the pH of the prereaction solution, and the pH at the end of feeding, are given in Table 3-1.

Comparative Example 3-3

With the exception that potassium oleate aqueous solution was fed in the same manner as in Example 3-1, barium ferrite nanoparticles were obtained by the same operation as in Comparative Example 1-3.

The maximum value of the difference between the pH that was continually monitored in the feeding of the potassium hydroxide aqueous solution to reaction tank 10 and the pH of the prereaction solution, and the pH at the end of feeding, are given in Table 3-1.

X-ray diffraction analysis of the particles obtained in the above Examples and Comparative Examples revealed them to be hexagonal ferrite (barium ferrite). Based on the average particle size, coefficient of variation in particle size, and results of particle size measurement of the hexagonal ferrite nanoparticles obtained, the shape of the particles was determined to be as shown in Table 3-2.

TABLE 3-1

|  | Ex. 3-1 | Ex. 3-2 | Ex. 3-3 | Comp. Ex. 3-1 | Comp. Ex. 3-2 | Comp. Ex. 3-3 |
|---|---|---|---|---|---|---|
| pH of prereaction solution | 7.9 | 9.8 | 12.3 | 12.0 | 4.6 | 4.5 |
| pH at the end of feeding | 7.3 | 10.3 | 12.1 | 12.2 | 11.8 | 12.0 |
| Maximum value of difference between pH during feeding and pH of prereaction solution | 1.2 | 0.8 | 0.2 | 0.4 | 7.2 | 7.5 |

TABLE 3-2

|  | Ex. 3-1 | Ex. 3-2 | Ex. 3-3 | Comp. Ex. 7 | Comp. Ex. 8 | Comp. Ex. 9 |
|---|---|---|---|---|---|---|
| Average particle size of barium ferrite nanoparticles [nm] | 19.5 | 17.0 | 16.0 | 21.0 | 23.0 | 20.0 |

TABLE 3-2-continued

|  | Ex. 3-1 | Ex. 3-2 | Ex. 3-3 | Comp. Ex. 7 | Comp. Ex. 8 | Comp. Ex. 9 |
|---|---|---|---|---|---|---|
| Coefficient of variation in particle size of nanoparticles [%] | 19.0 | 18.5 | 15.5 | 28.0 | 30.5 | 26.5 |
| Shape | Spherical shape | Spherical shape | Spherical shape | Spherical shape | Spherical shape | Spherical shape |

2. Examples and Comparative Examples Relating to Magnetic Recording Media (Magnetic Tape)

Examples 4-1 to 4-3 and Comparative Examples 4-1 to 4-3

(1) Formula of Magnetic Layer Coating Liquid

| (Magnetic liquid) | |
|---|---|
| Ferromagnetic powder (described in Table 4): | 100 parts |
| SO₃Na group-containing polyurethane resin: | 14 parts |
| (molecular weight: 70,000, SO₃Na groups: 0.4 meq/g) | |
| Cyclohexanone: | 150 parts |
| Methyl ethyl ketone: | 150 parts |
| (Abrasive liquids) | |
| Abrasive liquid A Alumina abrasive | 3 parts |
| (average particle diameter: 100 nm): | |
| Sulfonic acid group-containing polyurethane resin: | 0.3 part |
| (weight average molecular weight: 70,000, SO₃Na groups: 0.3 meq/g) | |
| Cyclohexanone: | 26.7 parts |
| Abrasive liquid B Diamond abrasive | 1 part |
| (average particle diameter: 100 nm): | |
| Sulfonic acid group-containing polyurethane resin: | 0.1 part |
| (weight average molecular weight: 70,000, SO₃Na groups: 0.3 meq/g) | |
| Cyclohexanone: | 26.7 parts |
| (Silica sol) | |
| Colloidal silica (average particle diameter: 100 nm): | 0.2 part |
| Methyl ethyl ketone: | 1.4 parts |
| (Other components) | |
| Stearic acid: | 2 parts |
| Butyl stearate: | 6 parts |
| Polyisocyanate (Coronate made by Nippon Polyurethane Industry Co., Ltd.): | 2.5 parts |
| (Solvents added to finish) | |
| Cyclohexanone: | 200 parts |
| Methyl ethyl ketone: | 200 parts |

(2) Formula of Nonmagnetic Layer Coating Liquid

| | |
|---|---|
| Nonmagnetic inorganic powder α-iron oxide: | 100 parts |
| Average major axis length: | 10 nm |
| Average acicular ratio: | 1.9 |
| Specific surface area by BET method: | 75 m²/g |
| Carbon black: | 25 parts |
| Average particle diameter: | 20 nm |
| SO₃Na group-containing polyurethane resin: | 18 parts |
| (weight average molecular weight: 70,000, SO₃Na groups: 0.2 meq/g) | |
| Stearic acid: | 1 part |
| Cyclohexanone: | 300 parts |
| Methyl ethyl ketone: | 300 parts |

(3) Formula of Backcoat Layer Coating Liquid

| | |
|---|---|
| Nonmagnetic inorganic powder α-iron oxide: | 80 parts |
| Average major axis length: | 0.15 μm |
| Average acicular ratio: | 7 |
| Specific surface area by BET method: | 52 m²/g |
| Carbon black: | 20 parts |
| Average particle diameter: | 20 nm |
| Vinyl chloride copolymer: | 13 parts |
| Sulfonic acid group-containing polyurethane resin: | 6 parts |
| Phenyl phosphonic acid: | 3 parts |
| Cyclohexanone: | 155 parts |
| Methyl ethyl ketone: | 155 parts |
| Stearic acid: | 3 parts |
| Butyl stearate: | 3 parts |
| Polyisocyanate: | 5 parts |
| Cyclohexanone: | 200 parts |

(3) Preparation of Magnetic Tape

The above magnetic liquid was dispersed for 24 hours in a batch-type vertical sand mill. Zirconia beads 0.5 mm in diameter were employed as the dispersion medium. The abrasive liquid was dispersed for 24 hours in a batch-type ultrasonic device (20 kHz, 300 W). These dispersions were mixed with the other components (silica sol, other components, and solvents added to finish) and then processed for 30 minutes in a batch-type ultrasonic device (20 kHz, 300 W). Subsequently, they were filtered with filters having an average pore diameter of 0.5 μm to prepare a magnetic layer coating liquid.

The various components of the nonmagnetic layer coating liquid were dispersed for 24 hours in a batch-type vertical sand mill Zirconia beads 0.1 mm in diameter were employed as the dispersion medium. The dispersion obtained was filtered with a filter having an average pore diameter of 0.5 μm to prepare a nonmagnetic layer coating liquid.

For the backcoat layer coating liquid, the lubricants (stearic acid and butyl stearate), polyisocyanate, and 200 parts of the cyclohexanone aside, the various components were kneaded and diluted in an open kneader. Subsequently, the mixture was subjected to 12 passes of dispersion processing, with the retention time of each pass being 2 minutes, at a rotor tip peripheral speed of 10 m/s, a bead fill rate of 80 percent, using zirconia beads 1 mm in diameter, with a horizontal bead mill dispersing device. Subsequently, the remaining components were added to the dispersion and the mixture was stirred with a dissolver. The dispersion obtained was filtered with a filter having an average pore diameter of 1 μm to prepare a backcoat layer coating liquid.

Subsequently, the nonmagnetic layer coating liquid was coated and dried to a thickness of 100 nm on a polyethylene naphthalate support 5 μm in thickness (having a center line surface roughness (Ra value) of 1.5 nm as measured using a 20-fold object lens with an optical three-dimensional roughness meter; a Young's modulus of 8 GPa in width direction; and a Young's modulus of 6 GPa in longitudinal direction). Subsequently, the magnetic layer coating liquid was applied thereover in a quantity calculated to yield a dry thickness of 70 nm. While the magnetic layer coating liquid was still wet, a magnetic field with a field strength of 0.6 T was applied vertically with respect to the coated surface to conduct vertical orientation processing. The coating liquid was then dried. Subsequently, the backcoat layer coating liquid was applied and dried to a thickness of 0.4 μm on the opposite side of the support.

Subsequently, a calender comprised of just metal rolls was used to conduct a surface smoothening treatment at a temperature of 100° C., a linear pressure of 300 kg/cm, and a rate of 100 m/minute. The product was then heat treated for 36 hours in a dry environment at 70° C. Following the heat treatment, the product was slit to ½ inch width to obtain a magnetic tape.

Evaluation Methods

1. Electromagnetic Characteristic (SNR) Evaluation

A magnetic signal was recorded on the various magnetic tapes that were prepared in the longitudinal direction of the tapes under the recording and reproduction conditions set forth below and reproduced with a magnetoresistive (MR) head. The reproduced signal was frequency analyzed with a spectrum analyzer made by Shibasoku. The ratio of the output at 300 kfci to the noise integrated over the range of 0 to 600 kfci was adopted as the SNR.

(Recording and Reproduction Conditions)

| | |
|---|---|
| Recording: Recording track width: | 5 μm |
| Recording gap: | 0.17 μm |
| Head saturation flux density Bs: | 1.8 T |
| Reproduction: Reproduction track width: | 0.4 μm |
| Distance between shields (sh-sh distance): | 0.08 μm |
| Recording wavelength: | 300 kfci |

The results are given in Table 4.

TABLE 4

| | Examples and Comparative Examples relating to magnetic tape ||||||||||
|---|---|---|---|---|---|---|---|---|---|---|
| | Ex. 4-1 | Ex. 4-2 | Ex. 4-3 | Ex. 4-4 | Comp. Ex. 4-1 | Comp. Ex. 4-2 | Comp. Ex. 4-3 | Comp. Ex. 4-4 | Comp. Ex. 4-5 | Comp. Ex. 4-6 |
| Ferromagnetic powder | Ex. 2-1 | Ex. 2-4 | Ex. 3-1 | Ex. 3-3 | Comp. Ex. 2-1 | Comp. Ex. 2-3 | Comp. Ex. 2-4 | Comp. Ex. 3-1 | Comp. Ex. 3-2 | Comp. Ex. 3-3 |
| SNR(dB) | +0.5 | +0.7 | +0.7 | +0.8 | ±0 | −0.2 | ±0 | −0.1 | −0.1 | ±0 |

Evaluation Results

As shown in the above tables, Examples yielded hexagonal ferrite powders of small average particle size and low coefficients of variation in particle size. The magnetic tapes of Examples in which these hexagonal ferrite powders were employed as ferromagnetic powder in the magnetic layers thereof exhibited high electromagnetic characteristics (SNRs), which can be seen in Table 4.

Based on the above results, an aspect of the present invention was determined to yield magnetic powders in the form of fine particles that were suited to high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal ferrite powder, which comprises:

preparing a hexagonal ferrite precursor-containing water-based solution by stirring and mixing a reaction solution which comprises an iron salt, an alkaline earth metal salt, and a base in a reaction tank; and removing the hexagonal ferrite precursor-containing water-based solution that has been prepared from the reaction tank and continuously feeding the hexagonal ferrite precursor-containing water-based solution into a reaction flow passage while conducting heating and pressurizing to converting the hexagonal ferrite precursor to hexagonal ferrite; wherein the preparation of the hexagonal ferrite precursor-containing water-based solution comprises a continual feed period during which feeding of the iron salt, the alkaline earth metal salt, and the base into a reaction tank which comprises a prereaction solution in which an iron salt and a base are not both present is continuously or intermittently continued;

during the continual feed period, at least a base is fed over a feed passage separate from feeding of the iron salt and the alkaline earth metal salt; and an amount of at least one from among the iron salt, the alkaline earth metal salt, and the base that is fed per unit time during the continual feed period is controlled and/or acid is added to the reaction solution in the reaction tank so that a pH of the reaction solution within the reaction tank during the continual feed period falls within a range relative to a $pH_{before}$, a pH of the prereaction solution, of $$pH_{before} - 2 \leq pH \leq pH_{before} + 2.$$

2. The method of manufacturing hexagonal ferrite powder according to claim 1, wherein the feeding of the iron salt, the alkaline earth metal salt, and the base is conducted over separate feed passages in the preparation of the hexagonal ferrite precursor-containing water-based solution.

3. The method of manufacturing hexagonal ferrite powder according to claim 1, wherein the iron salt and the alkaline earth metal salt are mixed and then fed to the reaction tank over the same feed passage in the preparation of the hexagonal ferrite precursor-containing water-based solution.

4. The method of manufacturing hexagonal ferrite powder according to claim 1, wherein at least an amount of the base being fed per unit time is increased, decreased, increased and then decreased, or decreased and then increased during the continual feed period.

5. The method of manufacturing hexagonal ferrite powder according to claim 4, wherein during the continual feed period, during a period within which an amount of the iron salt and the alkaline earth metal salt being fed per unit time is not varied, an amount of the base that is being fed per unit time is increased, decreased, increased and then decreased, or decreased and then increased.

6. The method of manufacturing hexagonal ferrite powder according to claim 2, wherein at least an amount of the base being fed per unit time is increased, decreased, increased and then decreased, or decreased and then increased during the continual feed period.

7. The method of manufacturing hexagonal ferrite powder according to claim 6, wherein during the continual feed period, during a period within which an amount of the iron salt and the alkaline earth metal salt being fed per unit time is not varied, an amount of the base that is being fed per unit time is increased, decreased, increased and then decreased, or decreased and then increased.

8. The method of manufacturing hexagonal ferrite powder according to claim 3, wherein at least an amount of the base being fed per unit time is increased, decreased, increased and then decreased, or decreased and then increased during the continual feed period.

9. The method of manufacturing hexagonal ferrite powder according to claim 8, wherein during the continual feed period, during a period within which an amount of the iron salt and the alkaline earth metal salt being fed per unit time is not varied, an amount of the base that is being fed per unit time is increased, decreased, increased and then decreased, or decreased and then increased.

10. The method of manufacturing hexagonal ferrite powder according to claim 1, wherein the iron salt, the alkaline earth metal salt, and the base are fed as solutions.

11. The method of manufacturing hexagonal ferrite powder according to claim 1, wherein the removal of the hexagonal ferrite precursor-containing solution that has been prepared from the reaction tank is conducted in parallel with feeding the iron salt, the alkaline earth metal salt, and the base.

12. The method of manufacturing hexagonal ferrite powder according to claim 1, wherein the preparation of the precursor-containing water-based solution is conducted in a batch reaction tank.

13. The method of manufacturing hexagonal ferrite powder according to claim 1, wherein the hexagonal ferrite precursor-containing water-based solution that is removed from the reaction tank is mixed with an organic compound and then continuously flowed in a reaction flow passage while being heated and pressurized.

14. The method of manufacturing hexagonal ferrite powder according to claim 1, which further comprises feeding an organic compound to the reaction tank in the preparation of the hexagonal ferrite precursor-containing water-based solution.

15. The method of manufacturing hexagonal ferrite powder according to claim 1, wherein the heating and the pressurizing are conducted by heating the hexagonal ferrite precursor-containing water-based solution flowing through the reaction flow passage to equal to or higher than 300° C. and pressurizing to equal to or higher than 20 MPa.

* * * * *